US008291562B2

(12) United States Patent
Webb

(10) Patent No.: US 8,291,562 B2
(45) Date of Patent: Oct. 23, 2012

(54) RAKE TINE REPLACEMENT TOOL

(76) Inventor: John Webb, Grand Island, NE (US)

( * ) Notice: Subject to any disclaimer, the term of this patent is extended or adjusted under 35 U.S.C. 154(b) by 366 days.

(21) Appl. No.: 12/800,341

(22) Filed: May 13, 2010

(65) Prior Publication Data

US 2011/0277290 A1    Nov. 17, 2011

(51) Int. Cl.
| | |
|---|---|
| B25B 27/14 | (2006.01) |
| B23Q 1/00 | (2006.01) |
| B23Q 3/00 | (2006.01) |
| B23Q 7/04 | (2006.01) |
| A01D 57/02 | (2006.01) |
| A01D 76/00 | (2006.01) |
| A01D 78/00 | (2006.01) |
| A01D 80/00 | (2006.01) |
| A01D 84/00 | (2006.01) |
| A01D 7/00 | (2006.01) |
| A44B 1/04 | (2006.01) |
| A44B 11/25 | (2006.01) |

(52) U.S. Cl. ............. 29/271; 29/278; 29/257; 29/283.5; 56/226; 56/227; 56/400; 56/400.21; 56/400.17; 24/129 R; 24/130

(58) Field of Classification Search .................... 29/271, 29/278, 257, 238, 235, 239, 283.5; 269/902; 56/226, 227, 400–400.21; D8/14; 24/129 R, 24/130
See application file for complete search history.

(56) References Cited

U.S. PATENT DOCUMENTS

| 2,488,802 | A | * | 11/1949 | Canalizo ............... 56/400.17 |
| 3,675,276 | A | * | 7/1972 | Nuse ........................ 24/130 |
| 4,214,428 | A | | 7/1980 | Caraway |
| 4,480,431 | A | * | 11/1984 | Beaudoin ................ 56/400.17 |
| 4,907,332 | A | * | 3/1990 | Christian et al. ............. 29/237 |
| 6,405,517 | B1 | | 6/2002 | Peeters et al. |
| 6,543,212 | B2 | | 4/2003 | Tonutti |
| 6,928,704 | B2 | * | 8/2005 | Johnson ..................... 24/130 |
| 2011/0219740 | A1 | * | 9/2011 | Abughazaleh ............ 56/400.11 |

* cited by examiner

*Primary Examiner* — Monica Carter
*Assistant Examiner* — Seahee Yoon
(74) *Attorney, Agent, or Firm* — Dennis L. Thomte; Thomte Patent Law Office LLC

(57) ABSTRACT

A tool for replacing rake tines, having inner and outer ends, of a rake wheel which includes a central disc-shaped support plate means and a peripheral rim spaced outwardly of the support plate means with the peripheral rim having a plurality of spaced-apart openings formed therein which receive the rake tines extending therethrough so that the outer ends of the rake tines are positioned outwardly of the peripheral rim, and means removably securing the inner ends of the rake tines to the support plate means. The tool comprises a plurality of spaced-apart body members adapted to be secured to tines not needing replacement and to replacement tines to maintain the replacement tines to be secured to the rake wheel.

11 Claims, 6 Drawing Sheets

RAKE TINE REPLACEMENT TOOL

BACKGROUND OF THE INVENTION

1. Field of the Invention

This invention relates to a tool for use in replacing one or more rake tines of a rake wheel of an agricultural hay rake with each of the rake wheels including a central hub and a series of rake tines extending outwardly from the central hub through a peripheral rim.

2. Description of the Related Art

Agricultural hay rakes such as disclosed in U.S. Pat. No. 6,543,212 are used to form a windrow of agricultural crop material such as alfalfa, hay, or other materials so that the windrow may be picked up and baled into square bales or large cylindrical bales. Usually, the hay rake has a pair of rake arm assemblies which are mounted on a frame means in a V-shaped manner so that the crop material is directed inwardly to form a windrow. In some cases, the hay rake is of the type described as a side delivery rake which consists of a single rake arm assembly having a plurality of rake wheels rotatably mounted thereon. In either case, the hay rake has a plurality of rake wheels with rake tines secured to a central hub and extending outwardly through a peripheral rim.

Each of the rake arm assemblies of the hay rakes of the prior art may consist of five to 20 rake wheel assemblies mounted to a frame structure. The hay rake is typically pulled parallel to the manner in which the crop was mowed, cut or harvested. The frame structure(s) of the rake arm assemblies are typically offset at acute angles from the center line of the direction of travel during operation. During the raking operation, the tines of the rake wheels rotate and momentarily engage the ground and rotate backwardly while traveling forwardly into the crop. After a given distance of forward travel, the wheel disengages the ground while dragging and rolling crop material inwardly with the process being repeated by the next rearward following wheel. Typically, the rake wheel assemblies cover nine feet to 30 feet widths so as to move the crop mowed flat in this width and merging it into one long continuous windrow which may be three feet to five feet wide. A person raking with a ground speed of ten to 15 mph can rake 160 acres of crop in 3.5 to five hours during that time, potentially traveling 50 miles during the process. The process is repeated many times in the harvest season with large scale harvesting operation covering linear distances of up to 2500 miles during which time each wheel rake continuously engages the ground and rotates. Such action repeated many times in close proximity to abrasive soils sets up high wear areas between the tine and the outer peripheral rim or keeper rim. It is this wear point that produces a wear pattern on the rake tine that ultimately leads to failure of the tine resulting in breakage. The absence of a broken tine adds an additional strain to the following tine which is already carrying more of the wheel down pressure and gathering and moving more crop inwardly, all leading to a cascading effect of tine failure. When enough tines are broken in succession, the rotating action of the rake wheel is greatly affected. If the mass of crop matter in front of the wheel becomes too great, the damaged segment aligns with the ground and instead of continuing to rotate, it stops and thereby causes the operator to leave the tractor and redistribute the bunch crop by hand. This problem ultimately leads to performing maintenance on the rake wheel tines.

It is this maintenance task that in its present form can require two or possibly three people to perform. The process of replacing one or more tines requires removing two bolts and nuts, one retaining clamp, and the broken tines. Repairs are usually conducted with the rake wheel assembly still attached to the rake and the tines to be replaced are positioned in their vertical position. The combination of general wear, polishing effect created by abrasive crop movement, and gravity makes the process of removing one or more tines difficult at best thus requiring more than one person to physically account for each tine replacement once the clamp is removed. In today's farming or ranching industry, an increasing problem is labor shortage. The fact that the repair of a rake wheel normally requires two or three people sometimes makes it difficult if not impossible, to find sufficient labor to repair the rake.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tool is provided for replacing rake tines, having inner and outer ends, of a rake wheel which includes a central disc-shaped support plate with a peripheral rim spaced outwardly of the support plate with the peripheral rim having a plurality of spaced-apart openings formed therein which receive the rake tines extending therethrough so that the outer ends of the rake tines are positioned outwardly of the peripheral rim. A plurality of clamps removably secure the inner ends of the rake tines to the support plate. The tool consists of a plurality of spaced-apart body members or segments which are preferably comprised of a rubber or plastic material. Each of the body members are interconnected by means of a cord extending therebetween. Each of the body members has an upper end, a lower end, a first side, a second side, an outer surface and an inner surface. Each of the body members have a first recess portion extending into the upper surface of the body member and a second recessed portion extending into the inner surface of the body member which communicates with the first recess portion and which extends downwardly therefrom intermediate the first and second sides of the body member. The body member also includes a third recessed portion, having upper and lower ends, which extends into the inner surface of the body member and which extends between the first and second sides of the body member. The upper end of the third recessed portion communicates with the lower end of the second recessed area. The depth of the third recessed portion is greater than the depth of the second recessed portion. The first, second and third recessed portions define a first projection adjacent the first side of the body member below the upper end and also defines a second projection adjacent the second side of the body member below the upper end thereof.

A fourth generally truncated V-shaped recessed portion, having upper and lower ends, extends into the inner surface of the body member. The upper end of the fourth recessed portion communicates with the lower end of the third recessed portion intermediate the first and second sides of the body member. A first elongated slot, having upper and lower ends, extends into the inner surface of the body member with the upper end of the first elongated slot communicating with the lower end of the fourth recessed portion. The first elongated slot extends downwardly from its upper end to the lower end of the body member adjacent the first side of the body member. A second elongated slot, having upper and lower ends, also extends into the inner surface of the body member with the upper end of the second elongated slot communicating with the lower end of the fourth recessed portion. The second elongated slot extends downwardly and laterally from its upper end to the lower end of the body member adjacent the second side of the body member.

The method of using the tool of this invention is also described.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
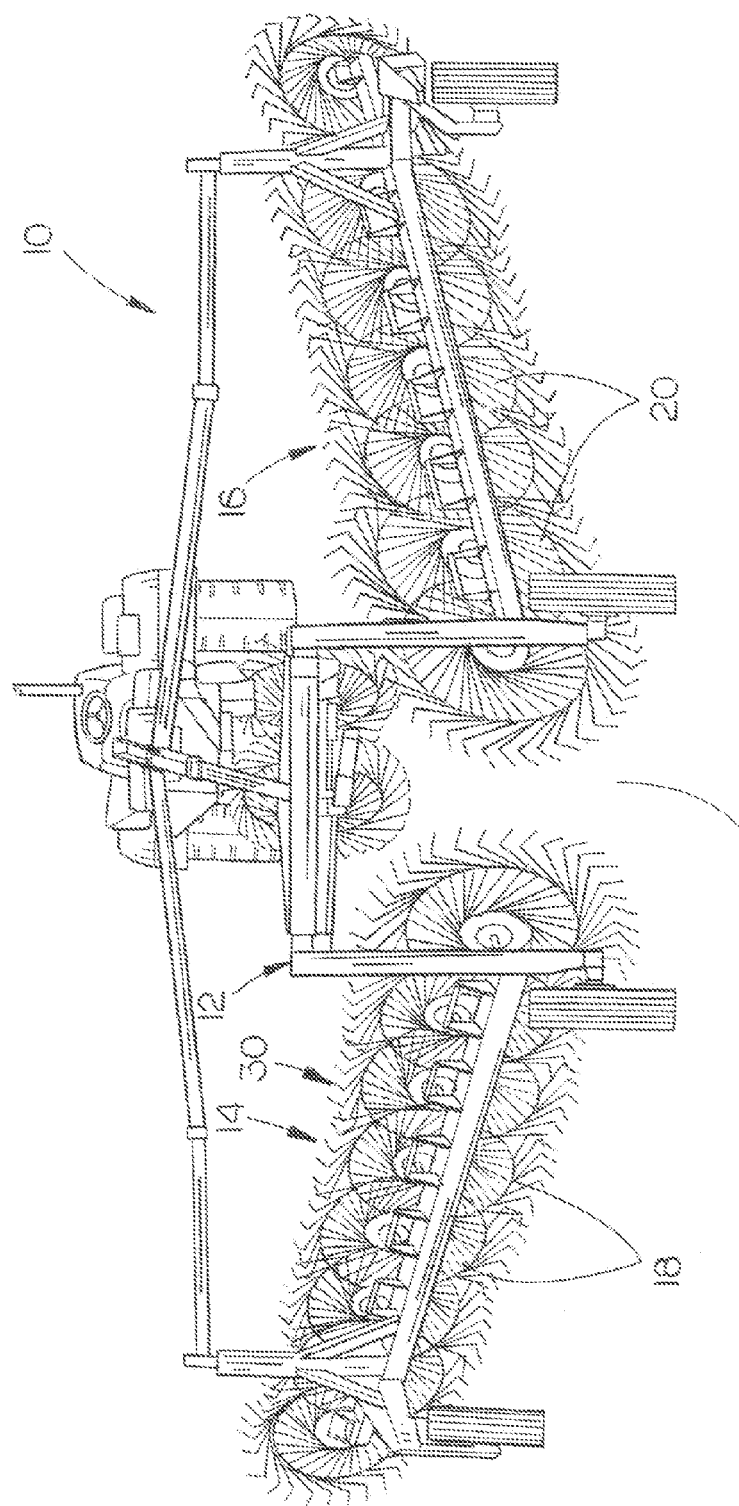
FIG. 1 is a rear view of a typical hay rake of the V-shaped type.

In FIG. 1, the numeral 10 refers to a V-rake including a wheeled frame means 12 having a left rake assembly 14 and a right rake assembly 16. A plurality of left-hand rake wheels 18 are rotatably mounted on left rake assembly 14 and a plurality of right-hand rake wheels 20 are rotatably mounted on right rake assembly for raking hay or the like to the center 22 of the V-rake 10. Although a V-rake 10 is shown, the rake could be a side delivery rake which would include only one of the rake assemblies 14 or 16. Other than the fact that the rake wheels 18 are left-hand rake wheels and the rake wheels 20 are right-hand rake wheels, the rake wheels 18 and 20 are identical. For purposes of description, only a rake wheel 18 will be described in detail.

Figure 3:
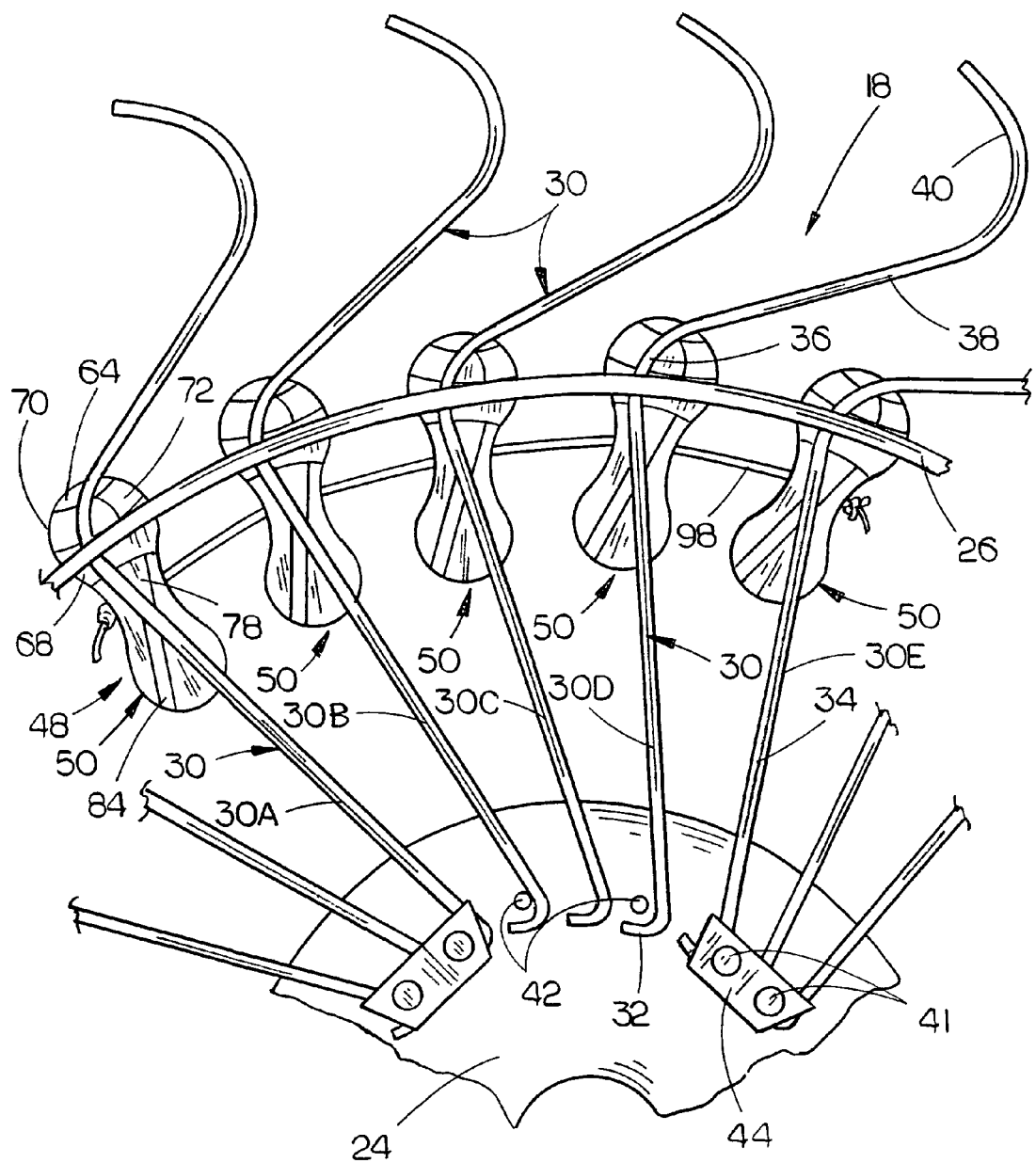
FIG. 3 is a partial side view illustrating the tool of this invention being used to replace three tines of a rake wheel.

Each rake wheel 18 includes a disc-shaped support plate or hub 24 which is rotatably mounted on the assembly 14 in conventional fashion. Rake wheel 18 includes a peripheral rim or retaining ring 26 positioned outwardly of plate 24. Rim 26 has a plurality of spaced-apart openings 28 formed therein. A plurality of tines 30 are radially spaced-apart on the rake wheel 18 in conventional fashion. Each tine 30 includes a generally U-shaped inner end 32, a first straight portion 34, a first curved or arcuate portion 36, a second generally straight portion 38, and a U-shaped outer end 40 as seen in FIG. 3. The tine 30 is extended through an opening 20 in rim 26 and the U-shaped inner end 32 is positioned at one side of the support plate 24 as seen in FIG. 3. When so positioned, the curved portion 36 of tine 30 will be positioned just outwardly of rim 26 as seen in FIG. 3. A pair of bolts 41 are then extended through a pair of openings 42 in support plate 24. A retainer plate or clamp 44, having a pair of openings 46, is then positioned over the inner ends 32 of a series of tines 30 and the clamp 44 is then secured to the assembly by nuts so that the inner ends of a series of tines are clamped onto the support plate 24.

For purposes of description, the numeral 30A will designate a tine which does not need replacing while the numerals 30B, 30C and 30D will refer to replacement tines that are being secured to the rake wheel 18. The numeral 30E refers to a tine which did not require replacement. Normally, the tines 30B, 30C and 30D will replace tines that have broken adjacent the outer side of rim 26. Usually, when the clamp 44, which secures the broken tines to the support plate 24, is removed, those broken tines will normally fall to the ground. When the replacement tines have been inserted through the respective openings 20 in rim 26, it is difficult to maintain those tines in position until the retaining clamp 44 is secured to plate 24. Usually, the replacement of the tines requires more than one person to hold the replacement tines in position until retaining clamp 44 is installed. It is for that reason that the tool of this invention has been provided.

Figure 6:
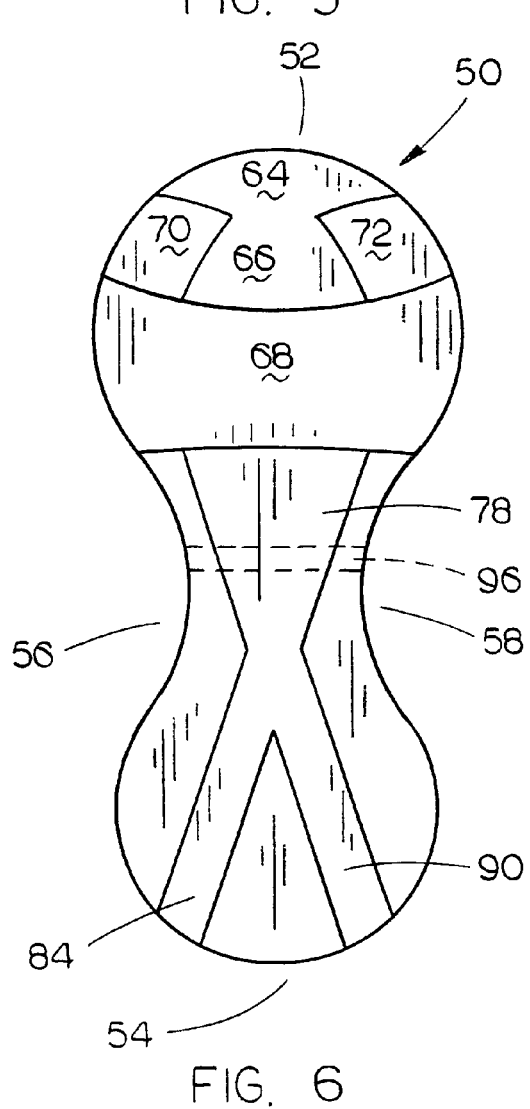
FIG. 6 is a front elevational view of one of the body members of the tool of this invention.
Figure 7:
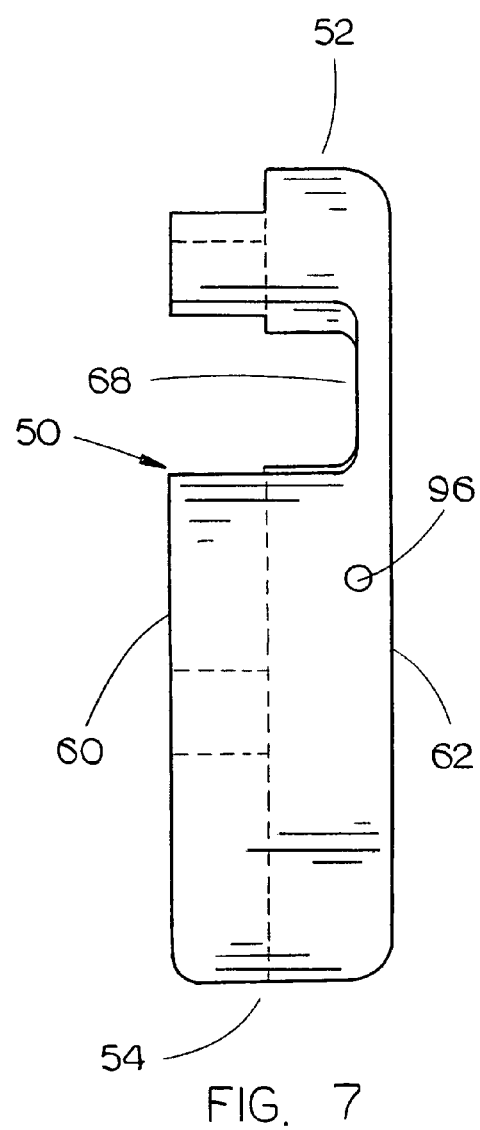
FIG. 7 is a side elevational view of one of the body members of the tool of this invention.

The tool of this invention is referred to by the reference numeral 48 which is comprised of a plurality of body members 50, the number of which will depend upon the number of tines to be replaced or the number with which the installer is comfortable. The body members 50 are identical and may be used with right-hand tines or left-hand tines. Body members 50 are preferably comprised of rubber or plastic. Body member 50 will be described as having an upper end 52, a lower end 54, sides 56 and 58, an inner surface 60 and an outer surface 62. Preferably, body member 50 defines a generally dog bone shape in plan view. Preferably the upper end 52 is arcuate in shape as is the lower end 54 as seen in FIG. 6.

Figure 4:
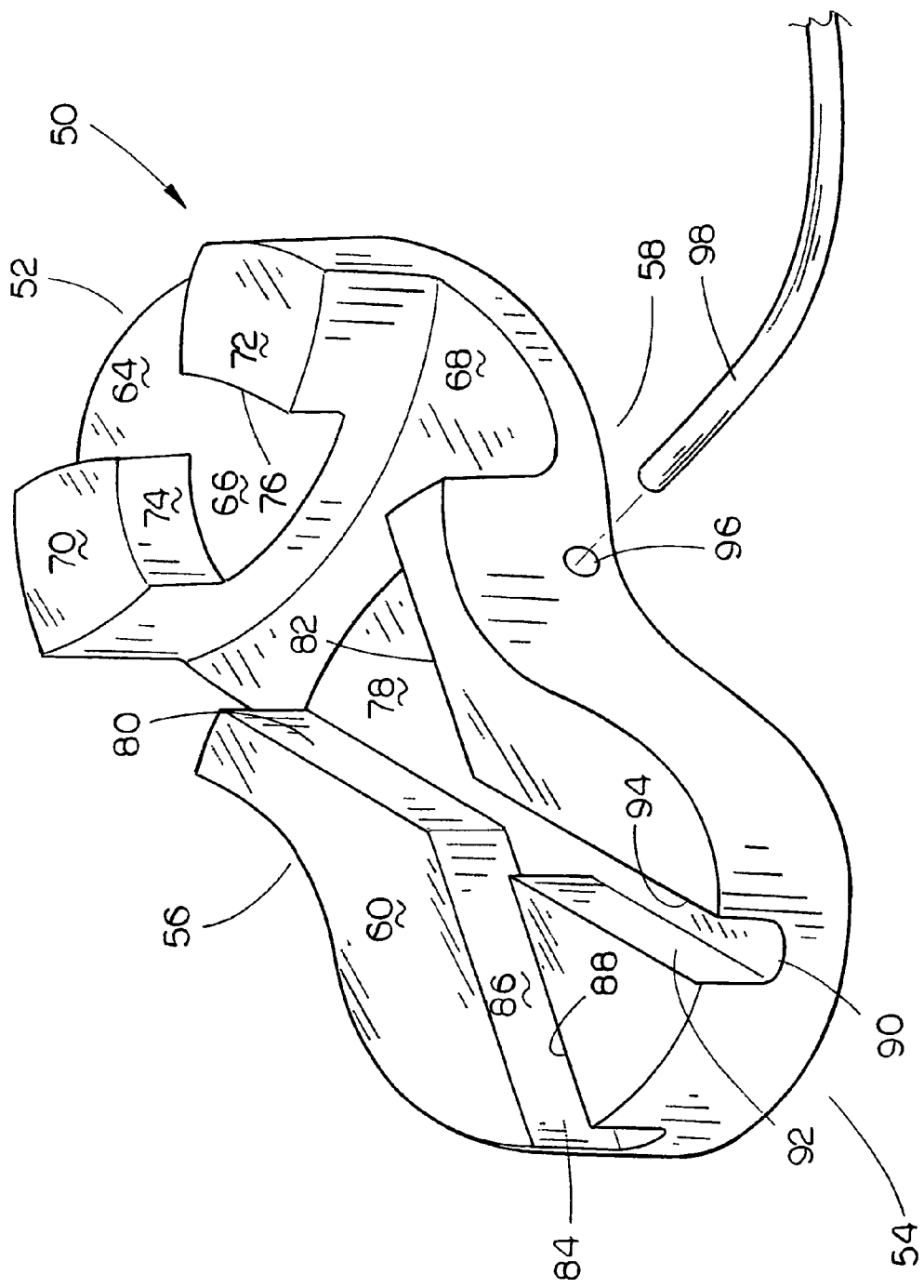
FIG. 4 is a perspective view of one of the body members of the tool of this invention.
Figure 5:
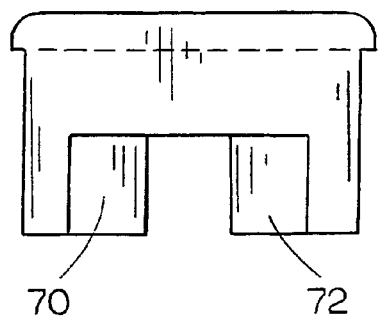
FIG. 5 is a top elevational view of one of the body members of the tool of this invention.

The inner surface 60 of body member 50 is provided with a first recessed portion 64 which extends into the upper end thereof. The lower end of recessed portion 64 communicates with a second recessed portion 66 which also extends into the inner surface 60 of body member 50. The depths of recessed portions 64 and 66 are the same. The numeral 68 refers to a third recessed portion which extends into the inner surface 60 of body member 50 below recessed portion 66. The depth of recessed portion 68 is greater than the depths of recessed portions 64 and 66. The recessed portions 64, 66 and 68 define a projection 70 which is adjacent to side 56 as best seen in FIG. 4. The recessed portions 64, 66 and 68 also define a projection 72 which is adjacent to side 58 as also best seen in FIG. 4. Projections 70 and 72 have curved inner side walls 74 and 76 respectively.

Body member 50 also has a fourth recessed portion 78 which extends into the inner surface thereof below recessed portion 68 with the upper end thereof communicating with the recessed portion 68. Recessed portion 78 generally has a truncated V-shaped configuration with side walls 80 and 82. The depth of recessed portion 78 is the same as the depths of recessed portions 64 and 66.

The inner surface 60 of body member 50 has a diagonally extending recessed portion or slot 84 formed therein which extends between the lower end of recessed portion 78 to the lower end 54 of body member 50. The walls 86 and 88 of slot 84 are parallel to wall 82 of recessed portion 82 with wall 88 being aligned with wall 82. The inner surface 60 of body member 50 also has a diagonally extending recessed portion or slot 90 formed therein which extends between the lower end of recessed portion 78 to the lower end 54 of body member 50. The walls 92 and 94 of slot 90 are parallel to wall 80 of recessed portion 78 with wall 92 being aligned with wall 80. The depth of slots 84 and 90 is the same as the depth of recessed portion 78. Body member 50 has a bore 96 formed therein which extends between the sides 56 and 58 thereof which is adapted to receive a cord 98 extending therethrough.

Figure 2:
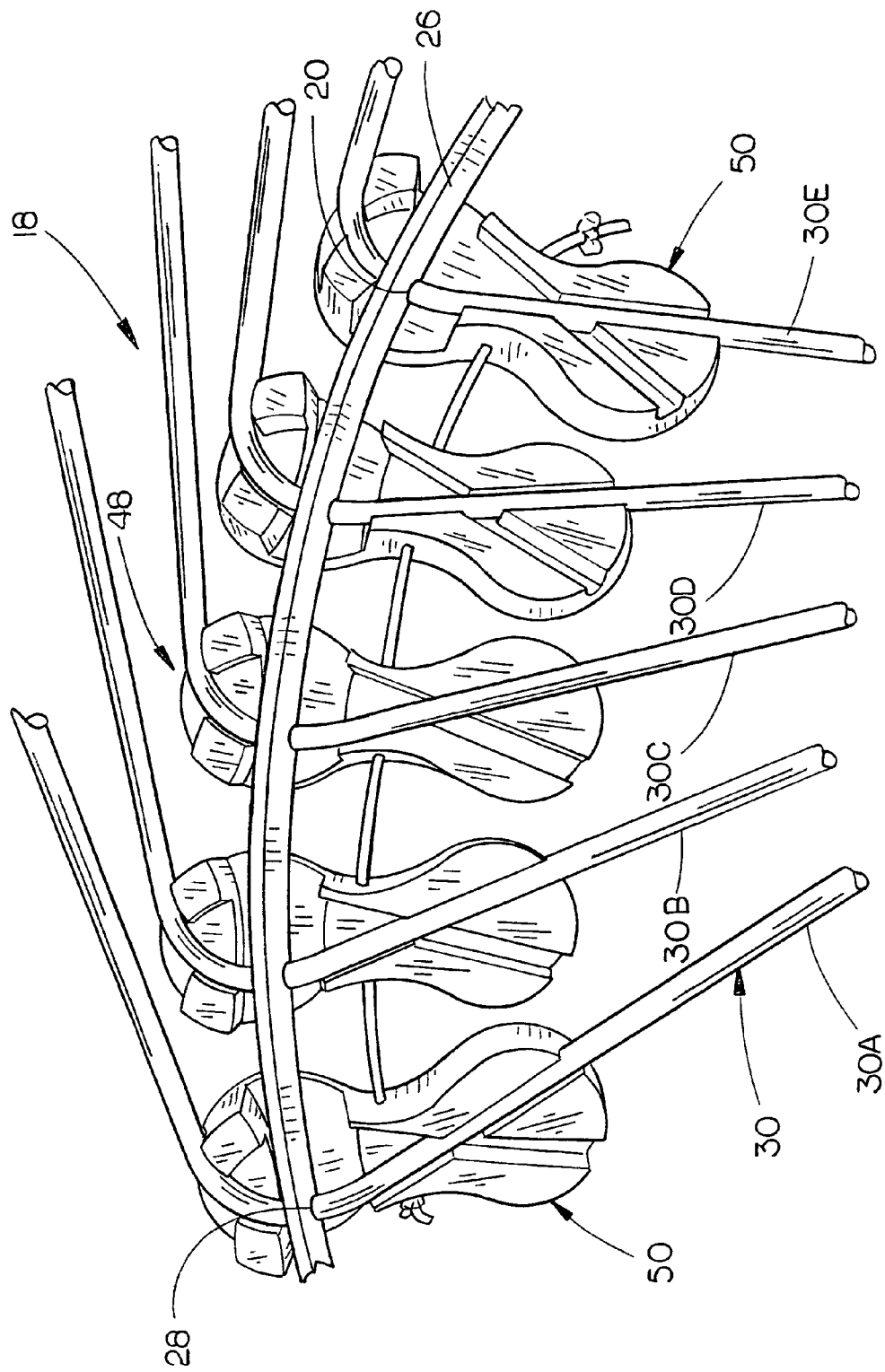
FIG. 2 is a partial perspective view illustrating the tool of this invention being installed on a rake wheel.
Figure 8:
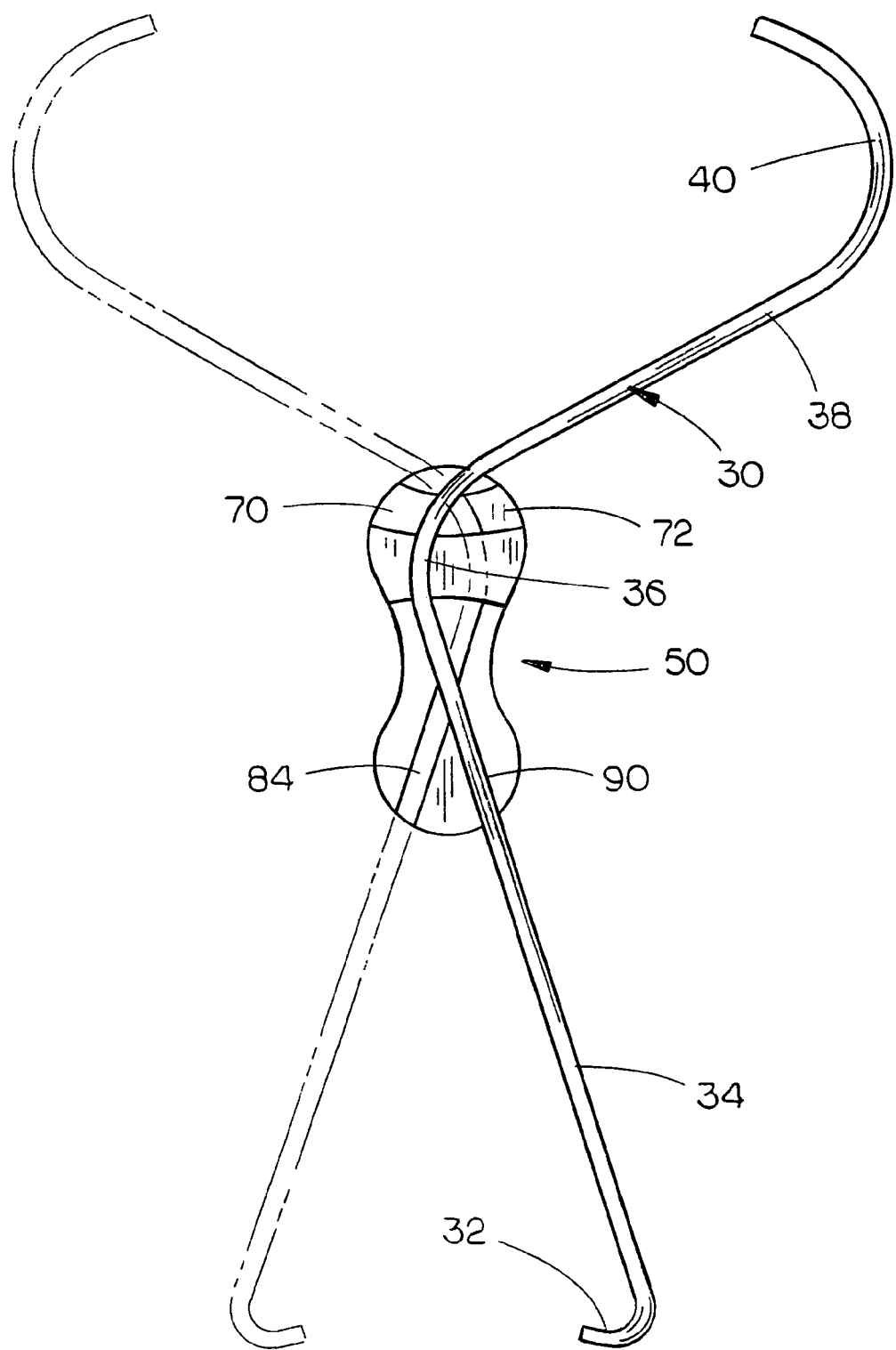
FIG. 8 is a front view illustrating the manner in which one of the body members may either be attached to a left-hand tine or a right-hand tine.

Assuming that tines 30B, 30C and 30D are replacement tines to replace broken tines, the end-most body member 50 will be secured to tine 30A, as illustrated in FIG. 2, with the straight portion 34 of tine 30 being received in the slot 90 in a snap-fit manner so as to extend upwardly between the projections 70 and 72, as illustrated in FIG. 8. The positioning of body member 50 on the end-most tine 30 as viewed in FIG. 2, provides a stable mounting point for the tool. As seen in FIG. 2, the rim 26 is positioned in the recessed portion 68 with the projections 70 and 72 preventing the body member 50 from moving downwardly with respect to the rim 26. The right-hand body member 30 is mounted on the tine 30E as seen in FIG. 2 with the three body members 50 being positioned between the left-hand body member 50 and the right-hand body member 50 as illustrated in FIG. 2 with the cord 98 extending therebetween to maintain the body members in position. The tines 30B, 30C and 30D are then snap-fitted into the body members 50 so that the tines 30B, 30C and 30D will be maintained in the proper position with the curved lower ends 32 thereof being positioned adjacent the plate 24. With the body members 30B, 30C and 30D maintaining the tines 30 in that position, the clamp 44 is then secured to the plate 24 to maintain the tines 30 in that position, as seen in FIG. 3. Once the clamp 44 has secured the lower end of the tines 30B, 30C and 30D to the plate 24, the body members 50 are removed from the tines.

The body members 50 may be used with right or left-hand tines as illustrated in FIG. 8

Thus it can be seen that a novel tool has been provided which enables the tines of wheel rakes to be easily replaced by a single person due to the unique aspects of the tool which maintain the replacement tines in position until the retaining clamp 44 has secured the lower ends of the replacement tines to the plate 24. Thus it can be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A tool for replacing rake tines, having inner and outer ends, of a rake wheel which includes a central disc-shaped support plate means and a peripheral rim spaced outwardly of the support plate means with the peripheral rim having a plurality of spaced-apart openings formed therein which receive the rake tines extending therethrough so that the outer ends of the rake tines are positioned outwardly of the peripheral rim, and means removably securing the inner ends of the rake tines to the support plate means, comprising:

a plurality of spaced-apart body members;

each of said body members having an upper end, a lower end, a first side, a second side, an outer surface and an inner surface;

each of said body members having:

(a) a first recessed portion extending into the upper inner surface of said body member;

(b) a second recessed portion extending into the inner surface of said body member which communicates with said first recessed portion and which extends downwardly therefrom intermediate said first and second sides of said body member;

(c) a third recessed portion, having upper and lower ends, extending into the inner surface of said body member which extends between said first and second sides of said body member; said upper end of said third recessed portion communicating with the lower end of said second recessed area;

(d) the depth of said third recessed portion being greater than the depth of said second recessed portion;

(e) said first, second and third recessed portions defining a first projection adjacent said first side of said body member below the upper end thereof and defining a second projection adjacent said second side of said body member below the upper end thereof;

(f) a fourth generally truncated V-shaped recessed portion, having upper and lower ends, extending into said inner surface of said body member, said upper end of said fourth recessed portion communicating with said lower end of said third recessed portion intermediate said first and second sides of said body member;

(g) a first elongated slot, having upper and lower ends, extending into said inner surface of said body member and said upper end of said first elongated slot communicating with said lower end of said fourth recessed portion, said first elongated slot extending downwardly from its said upper end to said lower end of said body member adjacent said first side of said body member; and (h) a second elongated slot, having upper and lower ends, extending into said inner surface of said body member, said upper end of said second elongated slot communicating with said lower end of said fourth recessed portion, said second elongated slot extending downwardly and laterally from its said upper end to said lower end of said body member adjacent said second side of said body member.

2. The tool of claim 1 wherein each of said body members have a generally dog bone shape when viewed in plan view.

3. The tool of claim 1 wherein said upper end of each of said body members is arcuate.

4. The tool of claim 1 wherein said lower end of each of said body members is arcuate.

5. The tool of claim 1 wherein each of said first and second projections of each of said body members has an arcuate inner surface.

6. The tool of claim 1 wherein each of said first and second elongated slots have substantially the same depth as said first and second recessed portion.

7. The tool of claim 1 wherein said upper end of said third recessed portion is arcuate.

8. The tool of claim 1 wherein said third recessed portion is adapted to receive a portion of the peripheral rim therein.

9. The tool of claim 1 wherein said first and second elongated slots are adapted to receive straight portions of a tine therein in a snap-fit manner.

10. The tool of claim 1 wherein said recessed portions of said slots are adapted to receive either right hand or left hand tines.

11. The tool of claim 1 wherein each of said body members have a bore extending therethrough between said first and second sides thereof and wherein a flexible cord extends therethrough which interconnects said body members.

* * * * *